(12) United States Patent
Nakagawa

(10) Patent No.: US 7,879,145 B2
(45) Date of Patent: Feb. 1, 2011

(54) INORGANIC COMPOSITION AND PRODUCTS AND MANUFACTURING PROCESS

(75) Inventor: Atsushi Nakagawa, Tokoname (JP)

(73) Assignee: Nichiha Corporation, Nagoya-shi (JP)

( * ) Notice: Subject to any disclaimer, the term of this patent is extended or adjusted under 35 U.S.C. 154(b) by 822 days.

(21) Appl. No.: 11/705,833

(22) Filed: Feb. 14, 2007

(65) Prior Publication Data

US 2008/0191165 A1 Aug. 14, 2008

(51) Int. Cl.
C04B 7/02 (2006.01)
C04B 14/04 (2006.01)

(52) U.S. Cl. .................. 106/713; 106/724; 106/731; 106/737

(58) Field of Classification Search .......... 106/713, 106/724, 731, 737
See application file for complete search history.

(56) References Cited

U.S. PATENT DOCUMENTS

| | | | |
|---|---|---|---|
| 3,841,885 A | 10/1974 | Jakel | |
| 3,972,972 A | 8/1976 | Yano et al. | |
| 4,101,335 A * | 7/1978 | Barrable | 106/644 |
| 4,985,119 A | 1/1991 | Vinson et al. | |
| 5,188,889 A | 2/1993 | Nagatomi et al. | |
| 5,804,003 A | 9/1998 | Nishizawa | |
| 5,858,083 A | 1/1999 | Stav et al. | |
| 5,945,044 A * | 8/1999 | Kawai et al. | 264/37.29 |
| 6,001,169 A | 12/1999 | Kawai | |
| 6,138,430 A * | 10/2000 | Van Acoleyen et al. | 52/745.19 |
| 6,506,248 B1 | 1/2003 | Duselis et al. | |
| 6,572,697 B2 * | 6/2003 | Gleeson et al. | 106/705 |
| 6,605,148 B2 | 8/2003 | Shirakawa et al. | |
| 6,676,745 B2 | 1/2004 | Merkley et al. | |
| 6,872,246 B2 | 3/2005 | Merkley et al. | |
| 7,344,593 B2 | 3/2008 | Luo et al. | |
| 7,621,087 B2 | 11/2009 | Utagaki et al. | |
| 2001/0047741 A1 | 12/2001 | Gleeson et al. | |
| 2003/0205172 A1 * | 11/2003 | Gleeson et al. | 106/679 |
| 2004/0168615 A1 | 9/2004 | Luo et al. | |
| 2005/0235883 A1 | 10/2005 | Merkley et al. | |
| 2006/0043627 A1 | 3/2006 | Sugita et al. | |
| 2006/0075931 A1 | 4/2006 | Utagaki et al. | |
| 2007/0186822 A1 * | 8/2007 | Utagaki et al. | 106/805 |
| 2007/0245930 A1 * | 10/2007 | Utagaki et al. | 106/716 |
| 2007/0246864 A1 * | 10/2007 | Utagaki et al. | 264/333 |
| 2007/0261607 A1 * | 11/2007 | Utagaki et al. | 106/805 |
| 2007/0277472 A1 * | 12/2007 | Sinclair | 52/605 |
| 2008/0072795 A1 * | 3/2008 | Utagaki et al. | 106/731 |
| 2008/0072796 A1 * | 3/2008 | Utagaki et al. | 106/731 |
| 2008/0072797 A1 * | 3/2008 | Utagaki et al. | 106/731 |
| 2008/0148999 A1 | 6/2008 | Luo et al. | |
| 2008/0157428 A1 * | 7/2008 | Utagaki et al. | 264/228 |
| 2008/0178771 A1 * | 7/2008 | Utagaki et al. | 106/737 |
| 2008/0203365 A1 | 8/2008 | Gleeson et al. | |

FOREIGN PATENT DOCUMENTS

| | | | |
|---|---|---|---|
| JP | 49-45934 | A | 5/1974 |
| JP | 49-45935 | A | 5/1974 |
| JP | 54-99131 | A | 8/1979 |
| JP | 58-110443 | A | 7/1983 |
| JP | 58110443 | A | 7/1983 |
| JP | 1-242452 | A | 9/1989 |
| JP | 1-320243 | A | 12/1989 |
| JP | 3-23248 | A | 1/1991 |
| JP | 3-97644 | A | 4/1991 |
| JP | 04-042875 | A | 2/1992 |
| JP | 4042875 | A | 2/1992 |
| JP | 04-114937 | A | 4/1992 |
| JP | 4114937 | A | 4/1992 |
| JP | 4-160045 | A | 6/1992 |
| JP | 4-187552 | A | 7/1992 |
| JP | 04-193748 | A | 7/1992 |
| JP | 04-295072 | A | 10/1992 |
| JP | 4295072 | A | 10/1992 |
| JP | 5-124845 | A | 5/1993 |
| JP | 05-229859 | A | 9/1993 |
| JP | 5229859 | A | 9/1993 |

(Continued)

OTHER PUBLICATIONS

JP 04305041 Nagata et al. (Oct. 28, 1992) abstract only. See U.S. Appl. No. 11/215,964 to get document.*

(Continued)

*Primary Examiner*—Paul Marcantoni
(74) *Attorney, Agent, or Firm*—Birch, Stewart, Kolasch & Birch, LLP

(57) ABSTRACT

The problems to be solved by the invention are to provide an inorganic composition for obtaining an inorganic product which is excellent in physical property such as installing property, and which is economical price, as well as a process for manufacturing the product.

Namely, the present invention provides, as a means to solve the conventional problems, an inorganic composition comprising the following raw materials: a hydraulic inorganic material, a siliceous material and a woody reinforcement, wherein the hydraulic inorganic material is a cementitious material, the siliceous material is a mixture of a rough particle size of siliceous material and a finely particle size of siliceous material, and the woody reinforcement is a wood powder and a pulp.

The effects of the present invention, it is possible to obtain an inorganic product which is excellent in physical property such as installing property, and which is economical price.

12 Claims, No Drawings

FOREIGN PATENT DOCUMENTS

| | | |
|---|---|---|
| JP | 6-32643 | 2/1994 |
| JP | 6-56496 A | 3/1994 |
| JP | 6-321602 A | 11/1994 |
| JP | 6-329457 A | 11/1994 |
| JP | 7-117027 A | 5/1995 |
| JP | 07-291707 A | 11/1995 |
| JP | 7-291763 A | 11/1995 |
| JP | 7291707 A | 11/1995 |
| JP | 08-040758 A | 2/1996 |
| JP | 8040758 A | 2/1996 |
| JP | 8-333155 A | 12/1996 |
| JP | 9-87001 A | 3/1997 |
| JP | 4193748 A | 7/1998 |
| JP | 10-231161 A | 9/1998 |
| JP | 11-322395 A | 11/1999 |
| JP | 2000-264701 A | 9/2000 |
| JP | 2001-106563 A | 4/2001 |
| JP | 2001-158678 A | 6/2001 |
| JP | 3-257052 | 8/2001 |
| JP | 2001-233653 | 8/2001 |
| JP | 2001-287980 A | 10/2001 |
| JP | 2002-166406 A | 6/2002 |
| JP | 2003-146731 A | 5/2003 |
| JP | 2004-196601 A | 7/2004 |
| WO | WO 2006/025331 A1 | 3/2006 |

OTHER PUBLICATIONS

JP 61256956 A Nichias Corp. (Nov. 14, 1986) abstract only. See U.S. Appl. No. 11/215,964 to get document.*
Japanese Office Action issued on Jan. 12, 2010 in related JP Application No. 2004-251708.
Japanese Office Action issued on Jun. 15, 2010 in related JP Application No. 2004-251708.
Third-Party Submission document filed on Jan. 4, 2010 in related Japanese Patent Application No. 2004-251708.
Third-Party Submission document filed on Jan. 5, 2010 in related Japanese Patent Application No. 2004-251706.
Third-Party Submission document filed on Jan. 5, 2010 in related Japanese Patent Application No. 2004-251707.
Third-Party Submission Notice issued on Jan. 28, 2010 in related Japanese Patent Application No. 2004-251708.
Third-Party Submission Notice issued on Jan. 29, 2010 in related Japanese Patent Application No. 2004-251706.
Third-Party Submission Notice issued on Jan. 29, 2010 in related Japanese Patent Application No. 2004-251707.

* cited by examiner

INORGANIC COMPOSITION AND PRODUCTS AND MANUFACTURING PROCESS

CROSS-REFERENCE TO RELATED APPLICATION

Japanese Patent Application No. 2006-353260

BACKGROUND OF THE INVENTION

1. Field of the Invention

The present invention relates to an inorganic composition using a hydraulic inorganic material and a siliceous material and a woody reinforcement, products thereof and a manufacturing process thereof.

2. Description of the Related Art

The following description sets forth the inventor's knowledge of related art and problems therein and should not be construed as an admission of knowledge in the prior art.

Hitherto, there is a manufacturing method of inorganic products so-called extrusion to extrude mixture of raw materials using a hydraulic inorganic material, a siliceous material, a woody reinforcement, water of an appropriate amount and thickening agents by extruder.

It is preferable to use the fiber reinforcement such as a pulp or to use the organic fiber such as a polypropylene fiber and a vinylon fiber, as reinforcement for strength maintenance after molding.

For example, in Japanese unexamined laid open patent publication No. 2001-233653, it is disclosed that the extrusion is using a particular wood fiber and a particular organic fiber.

But, because an organic fiber such as a polypropylene fiber is expensive, products price is up, and it is difficult to supply products at economical price.

And, there is the case that a wood powder is used for keeping form characteristics after an extrusion.

For example, in Japanese unexamined laid open patent publication No. H03-257052, it is disclosed that the extrusion is using a glass fiber for reinforcement fiber and adding a wood powder.

And, in Japanese unexamined laid open patent publication No. H06-032643, it is disclosed that the extrusion is using a vinylon fiber for reinforcement fiber and adding a wood powder which treated water repellent.

However, because the expensive glass fiber and the expensive vinylon fiber are used as reinforcement fiber, it is difficult to supply products at economical price.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

Under such circumstances, the problems to be solved by the invention are to provide an inorganic composition for obtaining an inorganic product which is excellent in physical property such as installing property, and which is economical price, as well as a process for manufacturing the product.

The present invention provides, as a means to solve the conventional problems, an inorganic composition comprising the following raw materials: a hydraulic inorganic material, a siliceous material and a woody reinforcement, wherein the hydraulic inorganic material is a cementitious material, the siliceous material is a mixture of a rough dividing siliceous material and a finely dividing siliceous material, the woody reinforcement is a wood powder and a pulp.

The effects of the present invention, it is possible to obtain an inorganic product which is excellent in physical property such as installing property, and which is economical price.

The above and/or other aspects, features and/or advantages of various embodiments will be further appreciated in view of the following description. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

DETAILED DESCRIPTION OF THE INVENTION

The present invention will be explained in detail below.

At first, each of the raw materials used for the inorganic composition is explained below.

[Hydraulic Inorganic Material]

A hydraulic inorganic material refers to a material which causes a hydration reaction upon contact with water to initiate hardening and includes cement and lime.

It is preferred to use a cementitious material such as portland cement, silica cement, fly ash cement, alumina cement.

Among them, it is preferred to use portland cement as the hydraulic inorganic material in the present invention.

The portland cement includes ordinary portland cement, high early strength portland cement, ultra high early portland cement, moderate heat portland cement and sulfate resistant portland cement (according to ASTM (American Society for Testing and Materials international) C150, Standard Specification for Portland cement Type I, Type II, Type III, Type IV and Type V) are included.

Amongst, ordinary portland cement (according to ASTM C150, Type I, Type II or a blend thereof, and according to AASHTO (American Association of State Highway and Transportation Officials) M85, Type I) is inexpensive and is for the use.

[Siliceous Material]

A siliceous material refers to a material which contains silica ($SiO_2$) as a chemical component.

In the present invention, examples of the siliceous material include silica sand, silica powder, diatomaceous earth, silica fume, fly ash, bottom ash, blast furnace slag, steel slag, shirasu balloon and expanded perlite.

Particularly, it is preferable in the present invention to use silica sand or fly ash.

[Rough Dividing Siliceous Material]

Then, it is preferable to use the siliceous material having a specific surface area of Blaine (air permeability test) of not less than 3000 $cm^2/g$ and not more than 4000 $cm^2/g$ as the rough dividing siliceous material.

If the specific surface area of Blaine of the rough dividing siliceous material is less than 3000 $cm^2/g$, there is danger that the reactivity in calcium silicate reaction is decreased.

[Finely Dividing Siliceous Material]

It is preferable to use the siliceous material having a specific surface area of Blaine of not less than 7000 cm$^2$/g and not more than 11000 cm$^2$/g as the finely dividing siliceous material.

And, it is preferable to use a finely dividing siliceous material dividing the rough dividing siliceous material by ball mills or roller mills and sorting the said specific surface area of Blaine.

If the specific surface area of Blaine of the finely dividing siliceous material is more than 11000 cm$^2$/g, it does not contribute to the improvement in physical properties so much, conversely, there is danger that the treatment as a granular material becomes difficult and it leads that the cost is up.

[Woody Reinforcement]

Examples of the woody reinforcement include wood powder, wood flake, wood wool, wood fiber, pulp, wood fiber bundle.

It is preferable to use in combination with a wood powder and a pulp.

Furthermore, it is preferable to use the wood powder which is passed 16 meshes of the standard sieve, furthermore, it is preferable to use the wood powder which is passed 30 meshes of the standard sieve.

It is preferable to use the pulp having an average fiber length of not less than 0.3 mm and not more than 1.5 mm. (by the paper and pulp examination method of Japan Technical Association of the Pulp and Paper Industry)

It is possible to select not only Japanese cypress and hemlock which is not including a hardening obstruction ingredient but also cedar and red cedar which is including a hardening obstruction ingredient enough for using tree class of the wood powder.

It is preferable to select LUKP (Laubholz unbleached kraft pulp) and LBKP (Laubholz bleached kraft pulp) for using tree class of the pulp.

[Thickening Agent]

In the present invention, a thickening agent is using as extrusion assistant, it is decreasing the extrusion pressure and making molding better by increase viscosity.

Examples of the thickening agents include cellulose derivative, e.g. methyl cellulose, ethyl cellulose, carboxymethyl cellulose, hydroxymethyl cellulose and polyvinyl alcohol.

It is preferable to use cellulose derivative.

[Other Component]

As an other component, it is preferable to use the water reducing admixture.

It is preferable in the present invention to use carboxylic acid, sulfonic acid and polyethylene glycol as the water reducing admixture.

Examples of the carboxylic acid include denaturation polycarboxylic acid, e.g. ether denaturation polymethacrylate, ester denaturation polymethacrylate and oxycarboxylic acid. Examples of the sulfonic acid include naphthalene sulfonic acid, lignin sulfonic acid, alkylaryl sulfonic acid, melamine sulfonic acid, particularly it is preferable to use naphthalene sulfonic acid formalin condensate.

Furthermore, as an other component, the following components may be optionally added: mineral powders such as vermiculite, bentonite and dolomite; inorganic lightweight materials; organic lightweight materials; pulverized inorganic products.

And, it is preferable to use mica.

Mica contributes to improvement in the dimensional stability of the product since it usually has a lamellar structure, is not hygroscopic and is a high elastic substance having a rigidity.

The mica used in the present invention is preferably in the form of flakes having an average particle size of not less than 100 μm and not more than 700 μm, and an aspect ratio of not less than 60 and not more than 100.

Incidentally, the aspect ratio herein means the ratio of thickness relative to particle size.

And, it is preferable to use a pigment.

Examples of pigment include titanium oxide, white lead, zinc flowers, three oxidation antimony, carbon black, chrome yellow, yellow iron oxide, rubigo, cadmium system pigment, cobalt system pigment, copper system pigment, calcium carbonate, barium sulfate, alumina white, silica powder and clay.

Incidentally, these illustrations do not restrict the present invention.

[Raw Material Composition of the Inorganic Composition]

The inorganic composition is preferably composed of the following raw materials: not less than 25% by mass and not more than 45% by mass of the hydraulic inorganic material, not less than 25% by mass and not more than 45% by mass of the siliceous material, not less than 7% by mass and not more than 15% by mass of the woody reinforcement.

If the amount of the hydraulic inorganic material is less than 25% by mass, development of the strength after first hardening is not sufficient, whereas if it is more than 45% by mass, the resulting product becomes rigid and fragile.

If the amount of the siliceous material is less than 25% by mass, a siliceous component which reacts in a calcium silicate reaction is not enough, whereas if it is more than 45% by mass, a calcium component is not enough to react an unreacted siliceous component.

If the amount of the woody reinforcement is less than 7% by mass, a problem with regard to toughness of the resulting product occurs, whereas if it is more than 15% by mass, uniform dispersion thereof in the raw materials becomes difficult.

It is preferable that the finely dividing siliceous material is not less than 20% by mass and not more than 50% by mass of the whole siliceous material, and it is preferable that the wood powder is not less than 10% by mass and not more than 60% by mass of the whole woody reinforcement.

If the amount of the finely dividing siliceous material is less than 20% by mass, it does not contribute to the last strength, whereas if it is more than 50% by mass, the product becomes rigid too much and the installing property turns worse.

If the amount of the wood powder is less than 10% by mass, it does not contribute the keeping form characteristic and there is not the merit of cost, whereas if it is more than 60% by mass, the quantity of bending decreases and the toughness is loss.

And, the mass ratio of the hydraulic inorganic material and the siliceous material is in a range of from 40:60 to 60:40.

If the mass ratio of the hydraulic inorganic material is less than 40%, there is danger that calcium silicate reaction does not finish happening enough, whereas if the mass ratio of the hydraulic inorganic material is more than 60%, there is danger that there is a lot of silica which does not react by calcium silicate reaction.

[Manufacturing Process]

Next, manufacturing process of the inorganic product in the present invention is explained below.

At first, a cementitious material as the hydraulic inorganic material, a finely dividing siliceous material and a rough dividing siliceous material as the siliceous material, a wood powder and a pulp as the fiber reinforcement and a thickening agent are mixed with a water of an appropriate amount.

And, the mixture is kneaded in a kneader ruder and is considered to be a mixture of raw materials.

Here, it may be added water reducing admixture for reducing the amount of addition of water.

Next, a mixture of raw materials is extruded by an extruder.

And, the molding object obtained by extrusion is hardened and cured, an inorganic product is obtained.

Hardening is preferable effected by raising the temperature to 40 to 80° C. in 6 to 12 hours.

Curing in an autoclave is preferably effected by raising the temperature to 145 to 170% in 6 to 10 hours.

In this way, an inorganic product is produced and the inorganic product is used for the external walls.

DESCRIPTION OF THE PREFERRED EMBODIMENTS

In the following paragraphs, some preferred embodiments of the invention will be described with reference to the attached drawing by way of example and not limitation.

It should be understood based on this disclosure that various other modifications can be made by those in the art based on these illustrated embodiments.

Embodiment 1

Examples 1-6 and Comparisons 1-4 will be illustrated by Embodiment 1 of the present invention.

Table 1

Table 1 shows the compositions of the raw materials used in Examples 1 to 6 according to the present invention.

The raw materials are mixed in the composition shown in the table, and water is added thereto, the mixture is kneaded in a kneader ruder and is considered to be the mixture of raw materials.

Ordinary portland cement is used as cement, silica sand or fly ash which specific surface area of Blaine is 3700 cm$^2$/g are used as the rough dividing siliceous material, silica sand which specific surface area of Blaine is 10000 cm$^2$/g is used as the finely dividing siliceous material, the wood powder which is passed 16 meshes of the standard sieve and the pulp which the average fiber length is 1.0 mm are used as woody reinforcement, the expanded polystyrene beads is used as lightweight materials, the hydroxy ethyl methyl cellulose (a brand name Metolose by Shin-Etsu Chemical Co. Ltd.) is used as thickening agent, the naphthalene sulfonic acid formalin condensate is used as the water reducing admixture.

Next, a mixture of raw materials is extruded by an extruder.

And, the molding object obtained by extrusion is hardened at 60° C. for 10 hours and cured at 165° C. for 8 hours in an autoclave, an inorganic product is obtained.

Table 2

Table 2 shows physical properties of the products of Examples 1 to 6 according to the present invention.

The bending strength and the quantity of the maximum deflection are measured according to JIS A 1408.

The extrusion stability is generally judged by viewing that extrusion speed, direction, flow, thickness and width of the molding object obtained by extrusion are stable or not, and the mark "⊙" denotes very good, the mark "○" denotes good, the mark "Δ" denotes a little bad, the mark "X" denotes bad.

The surface characteristics is judged by viewing that the surface unevenness of the molding object obtained by extrusion and the crack exist or not, and the mark "⊙" denotes very good, the mark "○" denotes good, the mark "Δ" denotes a little bad, the mark "X" denotes bad.

The installing property is judged by nailing performance of the product which is hardened and cured the molding object obtained by extrusion, and the mark "⊙" denotes very good, the mark "○" denotes good, the mark "Δ" denotes a little bad, the mark "X" denotes bad.

The performance of making a form is judged by sharpness of cutting, existence of the surface fluff, and existence of the crack at the time of cutting the molding object which is hardened and cured the molding object obtained by extrusion, and the "⊙" denotes very good, the mark "○" denotes good, the mark "Δ" denotes a little bad, the mark "X" denotes bad.

TABLE 1

| Raw material composition (% by mass) | Example 1 | Example 2 | Example 3 | Example 4 | Example 5 | Example 6 |
| --- | --- | --- | --- | --- | --- | --- |
| Portland cement | 35 | 35 | 36 | 35 | 35 | 35 |
| Rough dividing silica sand | 27 | 27 | 28 | 0 | 18 | 28 |
| Finely dividing silica sand | 8 | 8 | 9 | 8 | 17 | 7 |
| Fly ash | 0 | 0 | 0 | 27 | 0 | 0 |
| Expanded perlite | 0 | 0 | 0 | 0 | 0 | 0 |
| Wood powder | 6 | 3 | 2 | 5 | 5 | 5 |
| Pulp | 7 | 10 | 8 | 8 | 8 | 8 |
| Polypropylene fiber | 0 | 0 | 0 | 0 | 0 | 0 |
| Thickening agent | 0.8 | 0.8 | 0.8 | 0.8 | 0.8 | 0.8 |
| Water reducing admixture | 0.8 | 0.8 | 0.8 | 0.8 | 0.8 | 0.8 |
| Expanded polystyrene beads | 0.4 | 0.4 | 0.4 | 0.4 | 0.4 | 0.4 |
| Reject | 15 | 15 | 15 | 15 | 15 | 15 |
| Water ratio | 57 | 57 | 50 | 57 | 55 | 57 |

TABLE 2

| Physical property | Example 1 | Example 2 | Example 3 | Example 4 | Example 5 | Example 6 |
| --- | --- | --- | --- | --- | --- | --- |
| Absolute dry specific gravity | 1.04 | 1.07 | 1.10 | 1.04 | 1.10 | 1.05 |
| Bending strength after hardening (N/mm$^2$) | 3.4 | 3.4 | 4.8 | 2.7 | 4.0 | 3.4 |

TABLE 2-continued

| Physical property | Example 1 | Example 2 | Example 3 | Example 4 | Example 5 | Example 6 |
|---|---|---|---|---|---|---|
| Bending strength after curing (N/mm$^2$) | 11.9 | 11.8 | 15.5 | 12.0 | 13.5 | 12.2 |
| Quantity of the maximum deflection (mm) | 0.58 | 0.75 | 0.72 | 0.73 | 0.70 | 0.75 |
| Extrusion stability | ○ | ○~△ | ○ | ○ | ⊚~○ | ○ |
| Surface characteristics | ○ | ○~△ | ⊚ | ○ | ○ | ○ |
| Installing property | ○ | ⊚~○ | ○ | ⊚~○ | ○~△ | ○ |
| Performance of making a form | ○~△ | ○~△ | ○ | ○~△ | ○ | ○~△ |

EXAMPLE 1

The inorganic product of Example 1, in which the woody reinforcement is a wood powder and a pulp, and the amount of the wood powder is about 46% by mass which is in the range of not less than 10% by mass and not more than 60% by mass of the whole woody reinforcement, and the siliceous material is a mixture of a rough dividing siliceous material and a finely dividing siliceous material, and the amount of the finely dividing siliceous material is about 23% by mass which is in the range of not less than 20% by mass and not more than 50% by mass of the whole siliceous material, is good in extrusion stability, and is good in surface characteristics, and is good in installing property, and is good or a little bad in performance of making a form.

EXAMPLE 2

The inorganic product of Example 2, in which the woody reinforcement is a wood powder and a pulp, and the amount of the wood powder is about 23% by mass which is in the range of not less than 10% by mass and not more than 60% by mass of the whole woody reinforcement, and the siliceous material is a mixture of a rough dividing siliceous material and a finely dividing siliceous material, and the amount of the finely dividing siliceous material is about 23% by mass which is in the range of not less than 20% by mass and not more than 50% by mass of the whole siliceous material, is good or a little bad in extrusion stability, and is good or a little bad in surface characteristics, and is very good or good in installing property, and is good or a little bad in performance of making a form.

EXAMPLE 3

The inorganic product of Example 3, in which the woody reinforcement is a wood powder and a pulp, and the amount of the wood powder is about 20% by mass which is in the range of not less than 10% by mass and not more than 60% by mass of the whole woody reinforcement, and the siliceous material is a mixture of a rough dividing siliceous material and a finely dividing siliceous material, and the amount of the finely dividing siliceous material is about 24% by mass which is in the range of not less than 20% by mass and not more than 50% by mass of the whole siliceous material, is good in extrusion stability, and is very good in surface characteristics, and is good in installing property, and is good in performance of making a form.

EXAMPLE 4

The inorganic product of Example 4, in which the woody reinforcement is a wood powder and a pulp, and the amount of the wood powder is about 38% by mass which is in the range of not less than 10% by mass and not more than 60% by mass of the whole woody reinforcement, and the siliceous material is a mixture of a fly ash and a finely dividing siliceous material, and the amount of the finely dividing siliceous material is about 23% by mass which is in the range of not less than 20% by mass and not more than 50% by mass of the whole siliceous material, is good in extrusion stability, and is good in surface characteristics, and is very good or good in installing property, and is good or a little bad in performance of making a form.

EXAMPLE 5

The inorganic product of Example 5, in which the woody reinforcement is a wood powder and a pulp, and the amount of the wood powder is about 38% by mass which is in the range of not less than 10% by mass and not more than 60% by mass of the whole woody reinforcement, and the siliceous material is a mixture of a rough dividing siliceous material and a finely dividing siliceous material, and the amount of the finely dividing siliceous material is about 49% by mass which is in the range of not less than 20% by mass and not more than 50% by mass of the whole siliceous material, is very good or good in extrusion stability, and is good in surface characteristics, and is good or a little bad in installing property, and is good in performance of making a form.

EXAMPLE 6

The inorganic product of Example 6, in which the woody reinforcement is a wood powder and a pulp, and the amount of the wood powder is about 38% by mass which is in the range of not less than 10% by mass and not more than 60% by mass of the whole woody reinforcement, and the siliceous material is a mixture of a rough dividing siliceous material and a finely dividing siliceous material, and the amount of the finely dividing siliceous material is about 20% by mass which is in the range of not less than 20% by mass and not more than 50% by mass of the whole siliceous material, is good in extrusion stability, and is good in surface characteristics, and is good in installing property, and is good or a little bad in performance of making a form.

About the case of the example 1 to 6, even if it did not use expensive reinforcement fibers such as a polypropylene fiber, many physical properties more than or the same as comparison 1 that used them could be acquired, furthermore, it was economical price and the inorganic molding object was able to be manufactured.

Table 3

Table 3 shows the compositions of the raw materials of Comparisons 1 to 4.

TABLE 3

| Raw material composition (% by mass) | Comparison 1 | Comparison 2 | Comparison 3 | Comparison 4 |
|---|---|---|---|---|
| Portland cement | 36 | 35 | 35 | 35 |
| Rough dividing silica sand | 28 | 27 | 27 | 5 |
| Finely dividing silica sand | 9 | 8 | 8 | 30 |
| Fly ash | 0 | 0 | 0 | 0 |
| Expanded perlite | 0 | 0 | 0 | 0 |
| Wood powder | 0 | 13 | 0 | 5 |
| Pulp | 8 | 0 | 13 | 8 |
| Polypropylene fiber | 2 | 0 | 0 | 0 |
| Thickening agent | 0.8 | 0.8 | 0.8 | 0.8 |
| Water reducing admixture | 0.8 | 0.8 | 0.8 | 0.8 |
| Expanded polystyrene beads | 0.4 | 0.4 | 0.4 | 0.4 |
| Reject | 15 | 15 | 15 | 15 |
| Water ratio | 46 | 57 | 57 | 55 |

The mixed method of materials and the manufactured process of products were the same as that of a case of the examples.

Table 4

Table 4 shows various physical properties of the inorganic products of Comparisons 1 to 4 in which the inorganic products were measured in a manner similar to that in the examples.

Comparison 1

The inorganic product of Comparison 1, in which the woody reinforcement is only a wood powder and the amount of the polypropylene fiber is 2% by mass, is blank.

It is good or a little bad in extrusion stability, and is good in surface characteristics, and is good or a little bad in installing property, and is good in performance of making a form.

Example 1-6 show the value that is not inferiority compared with Comparison 1 of a blank.

TABLE 4

| Physical property | Comparison 1 | Comparison 2 | Comparison 3 | Comparison 4 |
|---|---|---|---|---|
| Absolute dry specific gravity | 1.19 | 1.00 | 1.07 | 1.08 |
| Bending strength after hardening (N/mm²) | 5.9 | 3.0 | 3.6 | 4.0 |
| Bending strength after curing (N/mm²) | 16.1 | 8.8 | 11.4 | 12.5 |
| Quantity of the maximum deflection (mm) | 0.65 | 0.52 | 0.76 | 0.69 |
| Extrusion stability | ○~Δ | X | ○~Δ | ◎~○ |
| Surface characteristics | ○ | Δ | Δ | ○ |
| Installing property | ○~Δ | Δ~X | ○~Δ | Δ~X |
| Performance of making a form | ○ | Δ | X | ◎ |

Comparison 2

The inorganic product of Comparison 2, in which the woody reinforcement is only a wood powder, is bad in extrusion stability, and is a little bad in surface characteristics, and is a little bad or bad in installing property, and is bad in performance of making a form.

Comparison 3

The inorganic product of Comparison 3, in which the woody reinforcement is only a pulp, is good or a little bad in extrusion stability, and is a little bad in surface characteristics, and is good or a little bad in installing property, and is bad in performance of making a form.

Comparison 4

The inorganic product of Comparison 4, in which the siliceous material is a mixture of a rough dividing siliceous material and a finely dividing siliceous material, and the amount of the finely siliceous material is about 86% by mass which is not in the range of not less than 20% by mass and not more than 50% by mass of the whole siliceous material, is very good or good in extrusion stability, and is good in surface characteristics, and is very good in performance of making a form, but is a little bad or bad in installing property.

Embodiment 2

Examples 7-9 and Comparisons 5-6 will be illustrated by Embodiment 2 of the present invention.

Table 5

Table 5 shows the compositions of the raw materials used in Examples 7 to 9 according to the present invention.

Expanded perlite is used as a lightweight material instead of expanded polystyrene beads, and materials composition is changed according to this.

The mixed method of materials and the manufactured process of products were the same as that of a case of the Embodiment 1.

TABLE 5

| Raw material composition (% by mass) | Example 7 | Example 8 | Example 9 |
|---|---|---|---|
| Portland cement | 31 | 32 | 32 |
| Rough dividing silica sand | 23.4 | 24.4 | 24.4 |
| Finely dividing silica sand | 6 | 7 | 7 |
| Fly ash | 0 | 0 | 0 |
| Expanded perlite | 10 | 10 | 10 |
| Wood powder | 5 | 2 | 5 |
| Pulp | 8 | 8 | 5 |
| Polypropylene fiber | 0 | 0 | 0 |
| Thickening agent | 0.8 | 0.8 | 0.8 |
| Water reducing admixture | 0.8 | 0.8 | 0.8 |
| Expanded polystyrene beads | 0 | 0 | 0 |
| Reject | 15 | 15 | 15 |
| Water ratio | 60 | 51 | 52 |

Table 6

Table 6 shows various physical properties of the inorganic products of Examples 7 to 9 in which the inorganic products were measured in a manner similar to that in the Embodiment 1.

EXAMPLE 7

The inorganic product of Example 7, in which the woody reinforcement is a wood powder and a pulp, and the amount of the wood powder is about 38% by mass which is in the range of not less than 10% by mass and not more than 60% by mass of the whole woody reinforcement, and the siliceous material is a mixture of a rough dividing siliceous material and a finely dividing siliceous material, and the amount of the finely dividing siliceous material is about 20% by mass which is in the range of not less than 20% by mass and not more than 50% by mass of the whole siliceous material, is good or a little bad in extrusion stability, and is good in surface characteristics, and is very good or good in installing property, and is good or a little bad in performance of making a form.

TABLE 6

| Physical property | Example 7 | Example 8 | Example 9 |
| --- | --- | --- | --- |
| Absolute dry specific gravity | 1.03 | 1.12 | 1.10 |
| Bending strength after hardening (N/mm²) | 2.5 | 3.5 | 3.5 |
| Bending strength after curing (N/mm²) | 9.6 | 9.6 | 10.2 |
| Quantity of the maximum deflection (mm) | 0.45 | 0.46 | 0.51 |
| Extrusion stability | ○~Δ | ○~Δ | ○~Δ |
| Surface characteristics | ○ | ○ | ○ |
| Installing property | ◎~○ | ○ | ○ |
| Performance of making a form | ○~Δ | ○ | ○ |

EXAMPLE 8

The inorganic product of Example 8, in which the woody reinforcement is a wood powder and a pulp, and the amount of the wood powder is about 20% by mass which is in the range of not less than 10% by mass and not more than 60% by mass of the whole woody reinforcement, and the siliceous material is a mixture of a rough dividing siliceous material and a finely dividing siliceous material, and the amount of the finely dividing siliceous material is about 22% by mass which is in the range of not less than 20% by mass and not more than 50% by mass of the whole siliceous material, is good or a little bad in extrusion stability, and is good in surface characteristics, and is good in installing property, and is good in performance of making a form.

EXAMPLE 9

The inorganic product of Example 9, in which the woody reinforcement is a wood powder and a pulp, and the amount of the wood powder is about 50% by mass which is in the range of not less than 10% by mass and not more than 60% by mass of the whole woody reinforcement, and the siliceous material is a mixture of a rough dividing siliceous material and a finely dividing siliceous material, and the amount of the finely dividing siliceous material is about 22% by mass which is in the range of not less than 20% by mass and not more than 50% by mass of the whole siliceous material, is good or a little bad in extrusion stability, and is good in surface characteristics, and is good in installing property, and is good in performance of making a form.

Table 7

Table 7 shows the compositions of the raw materials used in Comparisons 5 to 6 according to the present invention.

The mixed method of materials and the manufactured process of products were the same as that of a case of the Embodiment 1.

Table 8

TABLE 7

| Raw material composition (% by mass) | Comparison 5 | Comparison 6 |
| --- | --- | --- |
| Portland cement | 31 | 31 |
| Rough dividing silica sand | 23.4 | 23.4 |
| Finely dividing silica sand | 6 | 6 |
| Fly ash | 0 | 0 |
| Expanded perlite | 10 | 10 |
| Wood powder | 13 | 0 |
| Pulp | 0 | 13 |
| Polypropylene fiber | 0 | 0 |
| Thickening agent | 0.8 | 0.8 |

TABLE 7-continued

| Raw material composition (% by mass) | Comparison 5 | Comparison 6 |
| --- | --- | --- |
| Water reducing admixture | 0.8 | 0.8 |
| Expanded polystyrene beads | 0 | 0 |
| Reject | 15 | 15 |
| Water ratio | 57 | 57 |

TABLE 8

| Physical property | Comparison 5 | Comparison 6 |
| --- | --- | --- |
| Absolute dry specific gravity | 1.01 | 1.04 |
| Bending strength after hardening (N/mm²) | 3.2 | 3.2 |
| Bending strength after curing (N/mm²) | 8.7 | 10.5 |
| Quantity of the maximum deflection (mm) | 0.49 | 0.42 |
| Extrusion stability | Δ~X | ○~Δ |
| Surface characteristics | Δ | X |
| Installing property | Δ~X | ○~Δ |
| Performance of making a form | Δ | X |

Table 8 shows various physical properties of the inorganic products of Comparisons 5 to 6 in which the inorganic products were measured in a manner similar to that in the Embodiment 1.

Comparison 5

The inorganic product of Comparison 5, in which the woody reinforcement is only a wood powder, is a little bad or bad in extrusion stability, and is a little bad in surface characteristics, and is a little bad or bad in installing property, and is a little bad in performance of making a form.

Comparison 6

The inorganic product of Comparison 6, in which the woody reinforcement is only a pulp, is good or a little bad in extrusion stability, and is good or a little bad in installing property, but is a little bad or bad in surface characteristics, and is bad in performance of making a form.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure.

The limitations in the claims are to be interpreted broadly based on the language employed in the claims and not limited to examples described in the present specification or during the prosecution of the application, which examples are to be construed as non-exclusive. For example, in the present disclosure, the term "preferable" is non-exclusive and means "preferable, but not limited to".

In this disclosure and during the prosecution of this application, the terminology "present invention" or "invention" is meant as non-specific, general reference and may be used as a reference to one or more aspect within the present disclosure.

The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims.

In this disclosure and during the prosecution of this application, the terminology "embodiment" can be used to describe any aspect, feature, process or step, any combination thereof, and/or any portion thereof, etc. In some examples, various embodiments may include overlapping features.

What is claimed is:

1. An inorganic composition comprising the following raw materials:
   not less than 25% by mass and not more than 45% by mass of Portland cement;
   not less than 25% by mass and not more than 45% by mass of a siliceous material; and
   not less than 7% by mass and not more than 15% by mass of a woody reinforcement, wherein
   the siliceous material is a mixture of a siliceous material having not less than 3000 $cm^2/g$ and not more than 4000 $cm^2/g$ of a specific surface area of Blaine and a siliceous material having not less than 7000 $cm^2/g$ and not more than 11000 $cm^2/g$ of a specific surface area of Blaine,
   the amount of the siliceous material having not less than 7000 $cm^2/g$ and not more than 11000 $cm^2/g$ of a specific surface area of Blaine is not less than 20% by mass and not more than 50% by mass of the whole siliceous material,
   the woody reinforcement comprises a wood powder and a pulp, and
   the amount of the wood powder is not less than 10% by mass and not more than 60% by mass of the whole woody reinforcement.

2. The inorganic composition according to claim 1, wherein an average fiber length of the pulp is not less than 0.3 mm and not more than 1.5 mm.

3. The inorganic composition according to claim 1, further comprising a thickening agent and a water reducing admixture.

4. An inorganic product manufactured from the inorganic composition according to claim 1.

5. An inorganic product manufactured from the inorganic composition according to claim 2.

6. The inorganic composition according to claim 2, wherein the wood powder can pass through a 16 mesh sieve.

7. An inorganic product manufactured from the inorganic composition according to claim 3.

8. An inorganic product manufactured from the inorganic composition according to claim 6.

9. A process for manufacturing an inorganic product comprising the steps of:
   mixing in water a raw material composition comprising as main raw materials:
   not less than 25% by mass and not more than 45% by mass of Portland cement;
   not less than 25% by mass and not more than 45% by mass of a siliceous material; and
   not less than 7% by mass and not more than 15% by mass of a woody reinforcement, wherein
   the siliceous material is a mixture of a siliceous material having not less than 3000 $cm^2/g$ and not more than 4000 $cm^2/g$ of a specific surface area of Blaine and a siliceous material having not less than 7000 $cm^2/g$ and not more than 11000 $cm^2/g$ of a specific surface area of Blaine,
   the amount of the siliceous material having not less than 7000 $cm^2/g$ and not more than 11000 $cm^2/g$ of a specific surface area of Blaine is not less than 20% by mass and not more than 50% by mass of the whole siliceous material,
   the woody reinforcement comprises a wood powder and a pulp, and
   the amount of the wood powder is not less than 10% by mass and not more than 60% by mass of the whole woody reinforcement;
   extruding the mixture of materials; and
   hardening and curing the extruded material to obtain a inorganic product.

10. The process for manufacturing an inorganic product according to claim 9, wherein an average fiber length of the pulp is not less than 0.3 mm and not more than 1.5 mm.

11. The process for manufacturing an inorganic product according to claim 10, wherein the wood powder can pass through a 16 mesh sieve.

12. The process for manufacturing an inorganic product according to claim 9, wherein the raw material composition further comprises a thickening agent and a water reducing admixture.

* * * * *